United States Patent
Martin et al.

(10) Patent No.: US 11,669,535 B1
(45) Date of Patent: Jun. 6, 2023

(54) MAINTAINING AT A TARGET DATABASE SYSTEM A COPY OF A SOURCE TABLE OF A SOURCE DATABASE SYSTEM

(71) Applicant: International Business Machines Corporation, Armonk, NY (US)

(72) Inventors: Daniel Martin, Leinfelden-Echterdingen (DE); Christian Wilhelm Paul Hoerst, Boeblingen (DE); Jens Müller, Stuttgart (DE); Johannes Severin Kern, Boeblingen (DE); Kevin Pelletier, Saint-Genis Pouilly (FR); Vassil Radkov Dimov, Stuttgart (DE); Namik Hrle, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/530,396

(22) Filed: Nov. 18, 2021

(51) Int. Cl.
*G06F 16/2458* (2019.01)
*G06F 16/22* (2019.01)
*G06F 16/23* (2019.01)
*G06F 16/27* (2019.01)

(52) U.S. Cl.
CPC ...... *G06F 16/2477* (2019.01); *G06F 16/2282* (2019.01); *G06F 16/2358* (2019.01); *G06F 16/27* (2019.01)

(58) Field of Classification Search
CPC .................................................. G06F 16/2477
USPC ....................................................... 707/746
See application file for complete search history.

(56) References Cited

U.S. PATENT DOCUMENTS

| 5,504,879 A | * | 4/1996 | Eisenberg ................. G06F 8/71 |
| 9,747,313 B2 | | 8/2017 | Kaufmann |
| 2003/0204510 A1 | * | 10/2003 | Ball ........................ G06F 16/20 |
| 2008/0183663 A1 | * | 7/2008 | Day .................... G06F 16/2456 |

(Continued)

FOREIGN PATENT DOCUMENTS

| CN | 110069487 A | 7/2019 |
| CN | 110647579 A | 1/2020 |

(Continued)

OTHER PUBLICATIONS

Åhlén, "Time Traveling with Temporal Tables on SQL Server 2016", Sep. 4, 2017, SQLServerCentral, 12 pps., <https://www.sqlservercentral.com/articles/time-traveling-with-temporal-tables-on-sql-server-2016>.

(Continued)

*Primary Examiner* — Muluemebet Gurmu
(74) *Attorney, Agent, or Firm* — David K. Mattheis

(57) ABSTRACT

Creating at a target database system, a target table and a history table each having a set of attributes of a source table in addition to at least one time attribute, wherein the time attribute of a record indicates the time when the record is valid. Receiving a request for applying a change of the source table to the target table. The request comprises a time value generated by the source database system indicating a time of the change. The change to the target table and the time value may be assigned to the time attribute of the current version and previous version of the record. The previous version of the record may be stored in the history table. The target table and the history table may be used to process a redirected query comprising a selection criterion on the time attribute.

25 Claims, 5 Drawing Sheets

(56) References Cited

U.S. PATENT DOCUMENTS

| | | | |
|---|---|---|---|
| 2008/0306907 A1* | 12/2008 | Biswal | G06F 16/219 |
| 2012/0150791 A1* | 6/2012 | Willson | G06F 16/254 |
| | | | 707/600 |
| 2015/0052108 A1* | 2/2015 | Volk | G06F 11/1446 |
| | | | 707/649 |
| 2017/0011073 A1* | 1/2017 | Deshpande | G06F 16/215 |
| 2017/0075975 A1 | 3/2017 | Charron | |
| 2017/0322993 A1* | 11/2017 | Brodt | G06F 16/252 |
| 2018/0096001 A1 | 4/2018 | Soza | |
| 2019/0034502 A1 | 1/2019 | Onoda | |
| 2020/0026714 A1 | 1/2020 | Brodt | |
| 2020/0034365 A1* | 1/2020 | Martin | G06F 16/24554 |

FOREIGN PATENT DOCUMENTS

| | | |
|---|---|---|
| CN | 112463786 A | 3/2021 |
| CN | 113127266 A | 7/2021 |

OTHER PUBLICATIONS

IBM, "An introduction to the DataOps discipline", IBM Developer, downloaded from the Internet on Nov. 16, 2021, <https://www.ibm.com/developerworks/data/library/techarticle/dm-1410temporal-tables-db2zos/index.html>.

IBM, "IBM Db2 Analytics Accelerator for z/OS", 2 pps., Db2 Analytics Accelerator for z/OS, 3 pps., <https://www.ibm.com/products/db2-analytics-accelerator>.

IBM, "Physical and logical log records", Db2 forz/OS 11, 1 pp., © Copyright IBM Corporation 2021, <https://www.ibm.com/support/knowledgecenter/en/SSEPEK_11.0.0/admin/src/tpc/db2z_logrecordtype.html>.

IBM, "Time Travel Query using temporal tables", IBM Integrated Analytics System, May 13, 2021, 3 pps., <https://www.ibm.com/support/producthub/db2/docs/content/SSEPGG_11.5.0/com.ibm.db2.luw.admin.dbobj.doc/doc/c0058476.html>.

Jibson, "Time-Travel Queries: SELECT witty_subtitle FROM THE FUTURE", Jun. 22, 2016, 6 pps., Cockroach Labs, <https://www.cockroachlabs.com/blog/time-travel-queries-select-witty_subtitle-the_future/>.

Lu et al., "A Lightweight and Efficient Temporal Database Management System in TDSQL", Proceedings of the VLDB Endowment, vol. 12, No. 12, 12 pps., <http://www.vldb.org/pvldb/vol12/p2035-lu.pdf>.

Patent Cooperation Treaty PCT International Search Report, International Application No. PCT/IB2022/061002, International filing Date, Nov. 15, 2022, dated Mar. 13, 2023, 9 pgs.

* cited by examiner

MAINTAINING AT A TARGET DATABASE SYSTEM A COPY OF A SOURCE TABLE OF A SOURCE DATABASE SYSTEM

BACKGROUND

The present invention relates to the field of digital computer systems, and more specifically, to a method for maintaining, at a target database system, a copy of a source table of a source database system.

Replication is a process of maintaining a defined set of data in more than one location. It may involve copying designated changes from one source location to a target location, and synchronizing the data in both locations. The source and target can be in logical servers that are on the same machine or on different machines in a distributed network. Several approaches exist for moving data from one system to another. However, these approaches may need further improvement.

SUMMARY

Various embodiments provide a method for maintaining, at a target database system, a copy of a source table of a source database system, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for maintaining at a target database system a copy of a source table of a source database system, the source table having a set of attributes. The method includes creating, at the target database system, a target table and a history table, each having the set of attributes in addition to at least one time attribute, wherein the time attribute of a record indicates the time when the record is valid; and repeatedly: receiving a request for applying a change of the source table to the target table, the change involving at least one record of the source table, the request comprising a time value generated by the source database system indicating a time of the change; applying the change to the target table resulting in a current version and previous version of a record of the target table and assigning the time value to the time attribute of the current version and previous version of the record; storing the previous version of the record in the history table; receiving a redirected query referencing the source table, the redirected query comprising a selection criterion on the time attribute; and using the target table and the history table to process the redirected query according to the selection criterion.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a target database system (computer system) for maintaining a copy of a source table of a source database system, the source table having a set of attributes. The target database system is configured for: creating at the target database system a target table and a history table each having the set of attributes in addition to at least one time attribute, wherein the time attribute of a record indicates the time when the record is valid; and repeatedly: receiving a request for applying a change of the source table to the target table, the change involving at least one record of the source table, the request comprising a time value generated by the source database system indicating a time of the change; applying the change to the target table resulting in a current version and/or previous version of a record of the target table and assigning the time value to the time attribute of the current version and previous version of the record; storing the previous version of the record in the history table; receiving a redirected query referencing the source table, the redirected query comprising a selection criterion on the time attribute; and using the target table and the history table to process the redirected query according to the selection criterion.

BRIEF DESCRIPTION OF THE DRAWINGS

In the following embodiments of the invention are explained in greater detail, by way of example only, making reference to the drawings in which.

DETAILED DESCRIPTION

Figure 1A:
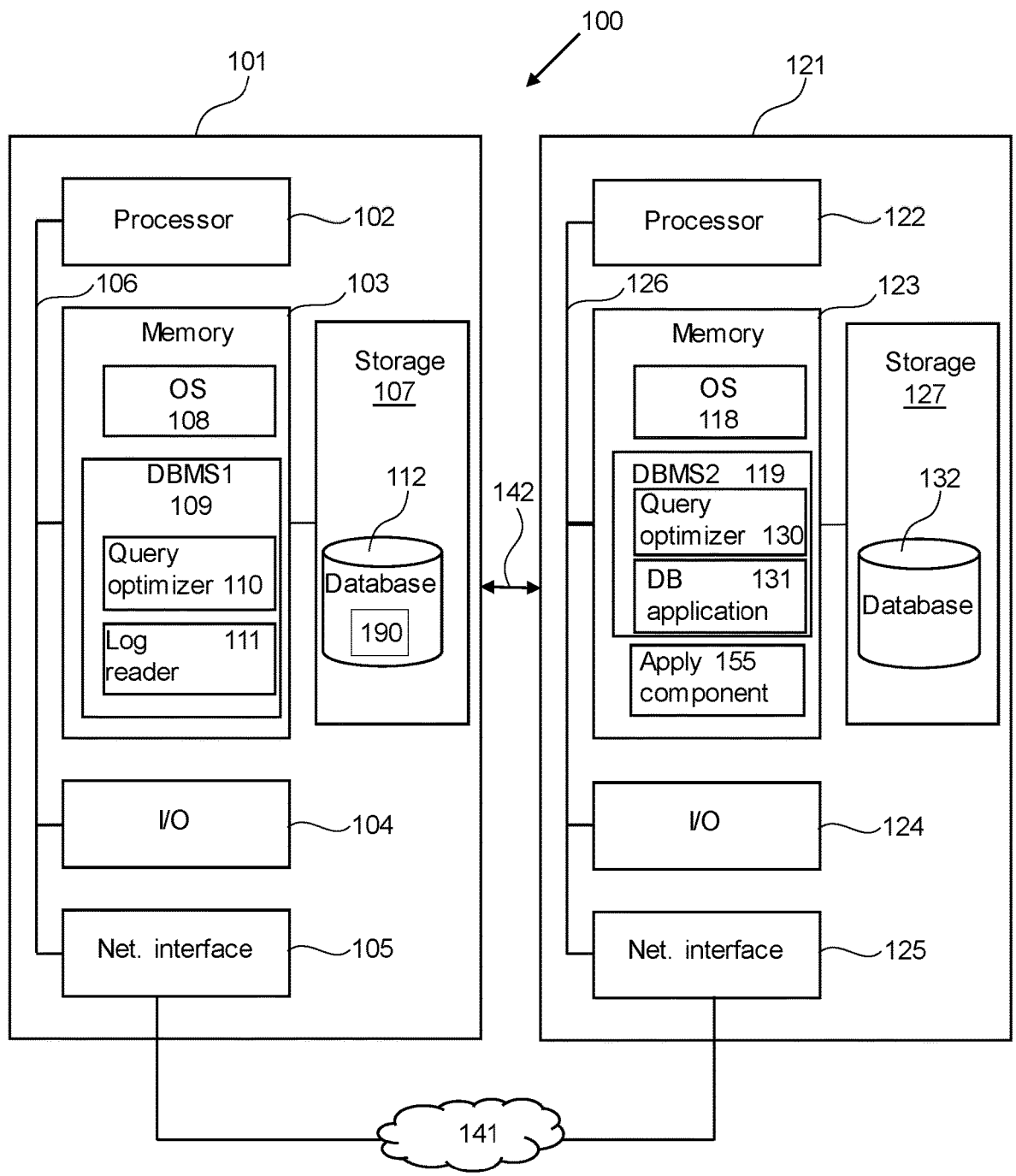
FIG. 1A depicts a data processing system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The source database system may, for example, be a transactional engine. The target database system may, for example, be an analytical engine. In a specific combination as implemented by the product "IBM Db2 Analytics Accelerator for z/OS", the source database system may be an online transaction processing (OLTP)-optimized relational DBMS (row-major organized storage) and the target database system may be an analytics-optimized relational DBMS (column-major organized storage). However, the present subject matter is not limited to the combination online transaction processing (OLTP)/online analytical processing (OLAP), as other combinations may be OLTP/graph store, or OLAP/key-value store. The source database system may have fewer processing resources compared to the target database system. In the source database system, the emphasis may be on fast processing, because the source databases may be read, written, and updated frequently. The target database system may enable complex queries to large amounts of data and thus may have more processing resources compared to the source database system. The present subject matter may make use of this property for performing data synchronization in view of offloading time-based queries to the target database system. The combination of relational database systems may advantageously be used to implement various types of queries such as the so-called hybrid transaction/analytical processing (HTAP) queries. The system may provide optimal response times on the same data for both, analytical and transactional-type queries without having to copy data or transform it into a schema best suited for the use-case.

For analytics, some use-cases may require time-travel queries as of the point in time of a particular date, e.g., for exact end-of-day or end-of-month reporting. Such requirements may be solved by the present target table and associated history table. The target table and the history table are provided as temporal tables. A temporal table refers a table that records the period of time when a row of the table is valid. According to the present subject matter, the temporal table is not created at the source database system, where the business events are recorded and stored; rather, the temporal table is created at the target database system but using time values created by the source database system. This may be advantageous because, as described above, a source database system such as a large OLTP-optimized database system may have limited processing resources, and thus adding temporal support to a transactional table may add significant additional impact to a usually very fine tuned and balanced system. Using the time values generated by the source database system may be advantageous as the timestamps at the target database system may be off by the amount of current replication latency as of the time of the target apply operation. However, latency varies over time, which may make time-travel as of the source time impossible. For that, the method may use the required source data modification timestamp from the source database system. With the present subject matter, the source database system can stay as is but may be fully enabled for time-travel queries by means of off-loading such queries to an "automatic historizing" target database. This may avoid the following resource consuming features at the source database system: additional storage, CPU, I/O and memory (bufferpool) capacity which is required to hold the extra data caused by the history table, where each change is recorded.

Every insert, update and delete not only changes the original table, but also adds rows to the associated history table. While the original table may stay equal in size (e.g., when only updates are used), the history table may grow unbounded with every change that happens on the original table. Additional index definitions must be maintained for the history table to ensure adequate performance of time-travel queries. Additional resources must be planned for running time-travel queries on that system.

Data synchronization may be a process of establishing consistency among data from a source table of the source database system to a target table of the target database system. The target table may be populated directly from the source table. The target table may be an exact 1:1 copy of the schema of the source table.

According to one embodiment, the change is a deletion of at least one record, update of at least one record and/or insertion of at least one record, wherein in case the change is a deletion of the record, the application of the change results in only the previous version of the record which is the deleted record, wherein in case the change is an update of the record, the application of the change results in the current version and the previous version of the record, wherein in case the change is an insertion of the record, the application of the change results in only the current version of the record which is the inserted record. The at least one time attribute may, for example, comprise a start time attribute and an end time attribute. Assigning the time value to the time attribute may comprise assigning the time value to at least one of the start time attribute and the end time attribute. If, for example, the at least one time attribute is an interval or range, assigning the time value to the time attribute may comprise changing the range using the time value e.g., to reflect the time when the record is valid.

According to one embodiment, the at least one time attribute comprises a start time attribute and end time attribute, wherein the start time attribute of the current version of the record indicates the time of insertion of the record in the source table or the time of update of the record in the source table, wherein the end time attribute of the current version of the record is set to a fixed maximum value, wherein the start time attribute of the of the previous version of the record indicates the time of insertion of the previous version record in the source table or the time of the update of the previous version of the record in the source table, wherein the end time of the previous version of the record indicates the time of deletion of the previous version record from the source table or the time of an update of the previous version of the record. The setting of the time attribute and the application of the change may concurrently be performed.

Assuming for simplification of the description, that at time t0, a record X having three attribute values a1, a2 and a3 is inserted in the source table. In this case, the target table may comprise the record X' with the three attributes a1, a2 and a3 augmented with start time attribute Tstart and end time attribute Tend, where the time attributes are assigned values as follows: Tstart=t0 and Tend=fixed_value, where fixed_value is a predefined fixed value that is used to indicate no end time yet (valid for most recent version of the row). Thus, after synchronization and setting of the values of the time attributes, the target table comprises the record X': "a1, a2, a3, Tstart=t0, Tend=fixed_value". Later on, at time t1, the record X may be updated at the source database system e.g., to comprise a11 (instead of a1), a2 and a3. In this case, the update may be propagated and applied to the target table. This may result in two records, the previous version of the record: "a1, a2, a3, Tstart=t0, Tend=fixed_value" and the current version of the record "a11, a2, a3, Tstart=t0, Tend=fixed_value". In addition, the time attributes may be set differently in the previous version of the record and the current version of the record. In the current version of the record, the start time attribute Tstart may be set to t1 and the fixed value may be maintained for the end time attribute Tend. The current version of the record would thus comprise: "a11, a2, a3, Tstart=t1, Tend=fixed_value". In the previous version of the record, the end time attribute Tend may be set to t1 and the time value t0 may be maintained for the start time attribute Tstart. The previous version of the record would thus comprise: "a1, a2, a3, Tstart=t0, Tend=t1" to indicate that the previous version of the record was valid from the time of creation t0 to the time of update t1. At time t2, the record X may be deleted from the source table. In this case, the record "a11, a2, a3, Tstart=t1, Tend=fixed_value" of the target table may be removed (and thus becomes previous version of the record) and the time attributes may be set as follows: the end time attribute Tend may be set to t2 and the value t1 of the start time attribute may be maintained. The previous version of the record would thus comprise: "a11, a2, a3, Tstart=t1, Tend=t2".

According to one embodiment, the target database system comprises an amount of processing resources higher than the amount of processing resources of the source database system. the processing resources may, for example, comprise CPU resources, storage resources etc.

According to one embodiment, the set of attributes are non-temporal attributes. A non-temporal attribute is different from a temporal attribute. A temporal attribute may be an attribute with a temporal type and whose value may, for example, be a function from a temporal domain.

According to one embodiment, the time value being a timestamp of the source database system. In another example, the time value may be at least one of a date, a time period and a time duration. The time values may be provided by the source database system in accordance with the time attribute defined in the target table or vice versa, that is the time attribute may be defined based on the time value types that are provided by the source database system.

According to one embodiment, the received request comprises a log record. The log record comprises the involved record and the time value as a timestamp. This may enable a seamless integration of the present subject matter with existing system because it may make use of existing features such as the log records without having to implement them anew.

FIG. 1A is a block diagram for a data processing system 100 suited for implementing method steps as involved in the disclosure. The data processing system 100 may, for example, comprise IBM Db2 Analytics Accelerator for z/OS (IDAA). The data processing system 100 comprises a source database system 101 connected to a target database system 121. The source database system 101 may, for example, comprise IBM Db2 for z/OS. The target database system 121 may, for example, comprise IBM Db2 Warehouse (Db2 LUW).

Source database system 101 includes processor 102, memory 103, I/O circuitry 104 and network interface 105 coupled together by bus 106.

Processor 102 may represent one or more processors (e.g., microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like. The storage 107 may comprise a source database 112. The source database 112 may, for example, comprise a source table 190. The source table 190 may comprise a set of attributes (columns) named $att_1, \ldots att_n$.

Figure 1B:
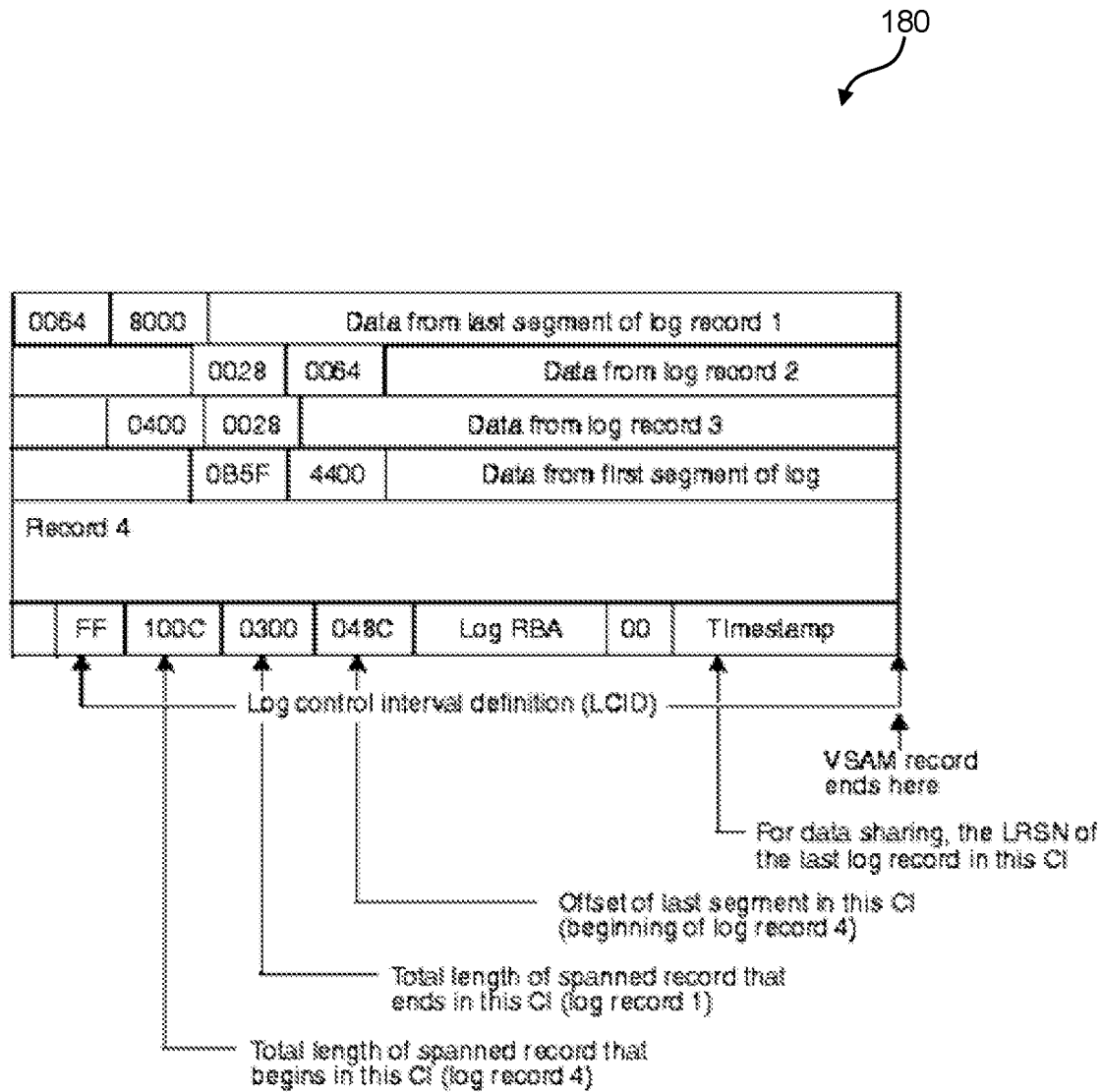
FIG. 1B shows an example structure of a log record.

Memory 103 may include one or more separate programs e.g., database management system DBMS1 109, each of which comprises an ordered listing of executable instructions for implementing logical functions, notably functions involved in embodiments of this invention. The software in memory 103 shall also typically include a suitable operating system (OS) 108. The OS 108 essentially controls the execution of other computer programs for implementing at least part of methods as described herein. DBMS1 109 comprises a log reader 111 and a query optimizer 110. The log reader 111 may read log records 180 of a transaction recovery log (not shown) of the source database system 101 and provide changed records to the target database system 121. The log reader 111 may read log records from the recovery log, extract relevant modification or change information (inserts/updates/deletes targeting tables in replication). Extracted information may be transmitted (e.g., as a request for application of the change) to target database system 121. FIG. 1B shows an example structure of the log record 180. FIG. 1B shows the structure of sequence of log records on Db2 for z/OS. The structure comprises a timestamp value (in source clock time) that is added to each log record produced by the source databases system, and uses a value that represents the time as of when the change happened. This timestamp may be the additional information captured by replication or bulk load. The query optimizer 110 may be configured for generating or defining query plans for executing queries e.g., on source database 112.

Target database system 121 includes processor 122, memory 123, I/O circuitry 124 and network interface 125 coupled together by bus 126.

Processor 122 may represent one or more processors (e.g., microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with persistent storage device 127 may be used for local data and instruction storage. Storage device 127 includes one or more persistent storage devices and media controlled by I/O circuitry 104. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs e.g., database management system DBMS2 119 and apply component 155, each of which comprises an ordered listing of executable instructions for implementing logical functions, notably functions involved in embodiments of this invention. The software in memory 123 shall also typically include a suitable OS 128. The OS 128 essentially controls the execution of other computer programs for implementing at least part of methods as described herein. DBMS2 129 comprises a DB application 131 and a query optimizer 130.

The DB application 131 may be configured for processing data stored in storage device 127. The query optimizer 130 may be configured for generating or defining query plans for executing queries e.g., on a target database 132. The apply component 155 may buffer log records sent from the log reader 111 and consolidate the changes into batches to improve efficiency when applying the modifications to the target database 132 via a bulk-load interface. This may enable to perform replication. The replication may be advantageous if it is able to keep up with the amount of modifications in order to keep the latency stable. If modifications surpass replication speed, latency may build up and might be too high. For that, the source database system 101 may be configured to perform a bulk load. The bulk load may load either entire table data or a set of partitions of a table at a given point in time. And data on the target database system 121 will reflect the source database system state at the time the load was executed.

Source database system 101 and target database system 121 may be independent computer hardware platforms communicating through a high-speed connection 142 or a network 141 via network interfaces 105, 125. The network 141 may, for example, comprise a local area network (LAN), a general wide area network (WAN), and/or a public network (e.g., the Internet). Each of the source and target database systems 101 and 121 may be responsible for managing its own copies of the data.

Although shown in FIG. 1A as separate systems, the source and target database systems may belong to a single system e.g., sharing a same memory and processor hardware, while each of the source and target database systems is associated with a respective DBMS and datasets e.g., the two DBMSs may be stored in the shared memory. In another example, the two database management systems DBMS1 and DBMS2 may form part of a single DBMS that enables communications and method performed by DBMS1 and DBMS2 as described herein. The first and second datasets may be stored on a same storage or on separate storages.

Figure 2:
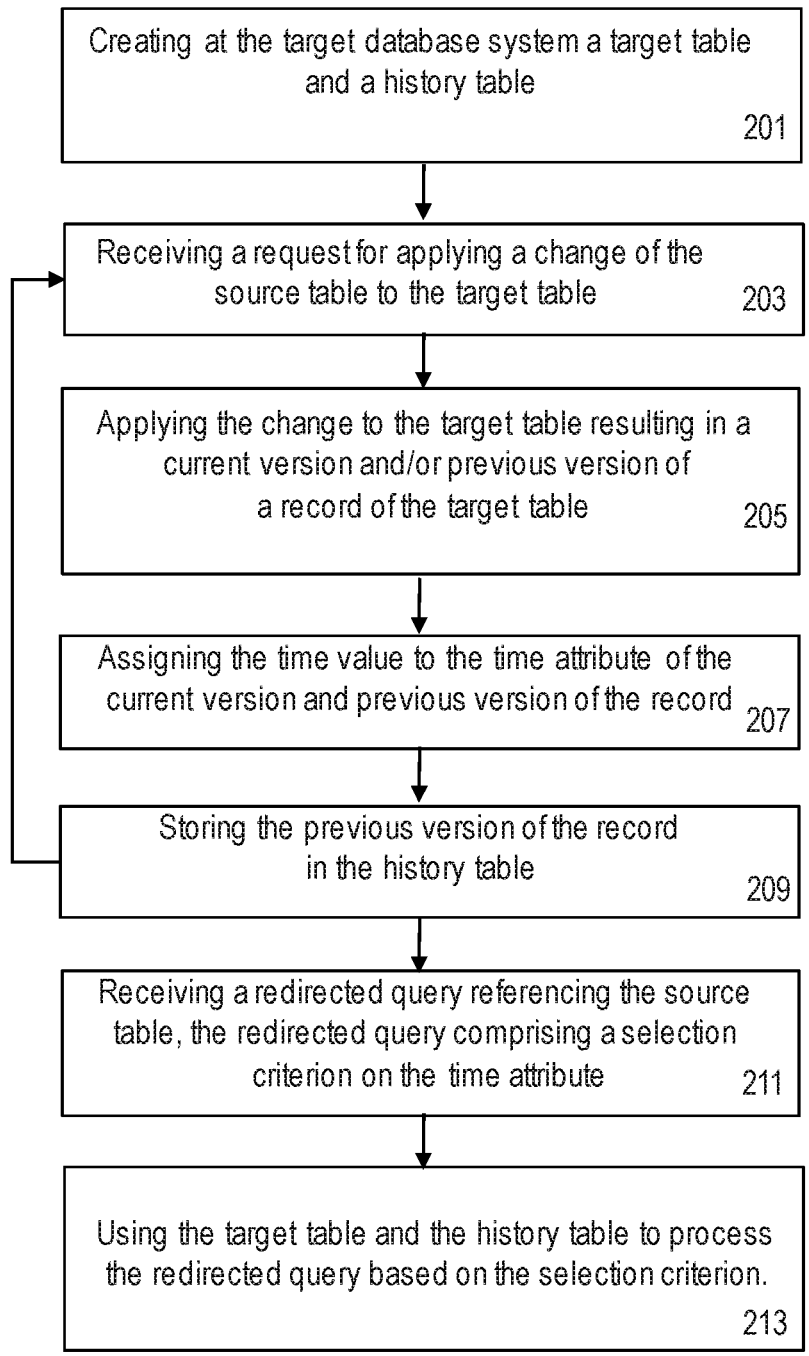
FIG. 2 is a flowchart of a method for maintaining at a target database system a copy of a source table of a source database system in accordance with an example of the present subject matter.

FIG. 2 is a flowchart of a method for maintaining at a target database system a copy (e.g., which is a synchronous or asynchronous copy) of a source table of a source database system, the source table having a set of attributes. For the purpose of explanation, the method described in FIG. 2 may be implemented in the system illustrated in FIG. 1A, but is not limited to this implementation. The method of FIG. 2 may, for example, be performed by the target database system 121 for maintaining a synchronous copy of the source table 190.

A target table and a history table may be created at the target database system 121 in step 201. Each table of the target table and the history table has the set of attributes $att_1, \ldots att_n$ in addition to at least one time attribute. The time attribute of a record indicates the time when the record is valid. The at least one time attribute may, for example, comprise one time attribute that is a range covering the start time and end time of the record. In another example, the at least one time attribute may comprise two time attributes namely a start time attribute and an end time attribute. Assuming for easy of description, that the at least one time attribute comprises the start time attribute $att_{ST}$ and the end time attribute $att_{ET}$. In this case, each of the target table and the history table comprises the attributes (columns) $att_1, \ldots att_n, att_{ST}, att_{ET}$. The target table and the history table may, for example, be created in response to creating the source table in the source database system 101. For example, enabling a table for time-travel in a system time period may cause a copy of the source table to be created on the target database system. In addition to being a 1:1 copy on the target database system, the target table is enabled for historization so that a history archive table is attached. The source table is enabled for replication, targeting the temporal table on the target database system.

A request may be received for applying a change of the source table 190 to the target table in step 203. The change involves at least one record of the source table 190. In addition, the request comprises a time value generated by the source database system indicating a time at which the change occurred. The request may, for example, be a replication request for performing replication, or a bulk load request for performing a bulk load. The request may, for example, be received from the log reader 111.

In one example, the change of the source table may refer to the initial creation of the source table. That is, the change involves all records of the source table. In this case, the application of the change to the target table may consist of inserting all records of the source table in the (empty) target table. In this example, the target table and the history table may be created in response to receiving the request.

In another example, the change of the source table may be an update of one or more records of the source table. In this case, the change involves said one or more records. In another example, the change of the source table may be a deletion of one or more records. In this case, the change involves said deleted one or more records.

The change may be applied to the target table in step 205. The application of the change may result in a current version and/or previous version of a record of the target table dependent on the type of the change being applied. In case the change is a deletion of a record, the application of the change results in only the previous version of the record, which is the deleted record. In case the change is an update of a record, the application of the change results in the current version and the previous version of the record. In case the change is an insertion of a record, the application of the change results in only the current version of the record, which is the inserted record. The application of the change may be implemented by setting the values of the set of attributes $att_1, \ldots att_n$ in the target table.

The time value may be assigned to the time attribute of the current version and previous version of the record in step 207. For example, the values of the attributes $att_{ST}$ and $att_{ET}$ may be set to the time values received in the request. The time value may be used to populate the start time attribute $att_{ST}$ and/or the end time attribute $att_{ET}$, depending of the nature of the change. In case the change is an insert, the time attributes may be set as follows: the start time attribute $att_{ST}$ may be set to the received time value ($att_{ST}$=timestamp) in the current version of the record when the change is an insert of said record while the value of $att_{ET}$ is maintained or set to a default value such as NULL value. The default value may be used to indicate no end time yet (valid for most recent version of the row). In case the change is a delete of a record, the time attributes may be set as follows: the end time attribute $att_{ET}$ may be set to the received time value ($att_{ET}$=timestamp) in the record when the change is a delete of said record while the value of the start time attribute $att_{ST}$ is maintained. Updates may be decomposed into a pair of <delete, insert> events, where the deleted event involves the previous version of the record and the insert event involves the current version of the record. In this case, the time attributes of the previous version of the record and the current versions of the record may be set as described above for the delete and insert cases respectively.

For example, the change is an insertion of a record having values $v_1^{new} \ldots v_n^{new}$ of the set of attributes $att_1, \ldots att_n$ respectively, and the time value received in the request is the time at which the record is inserted in the source table. In this case, the application of the change may set the values $v_1^{new} \ldots v_n^{new}$ to the set of attributes $att_1, \ldots att_n$ in the target table respectively i.e., inserting the record in the target table. In addition, the time value received in the request may be assigned to the start time attribute $att_{ST}$. Since this is an insertion of a new record, the end time attribute $att_{ET}$ may be set to a fixed value (e.g., NULL value) e.g., the fixed value may be received in the request or be set independently by the target database system. The fixed value may be used to indicate no end time yet.

In another example, the change is an update of an existing record of the source table (and target table). The existing record may, for example, have values $v_1^{old} \ldots v_n^{old}$ of the set of attributes $att_1, \ldots att_n$ respectively and values $t_s^{old} \ldots t_e^{old}$ of the time attributes $att_{ST}$ and $att_{ET}$ respectively. The request may indicate the new values $v_1^{new} \ldots v_n^{new}$ of the set of attributes $att_1, \ldots att_n$ respectively and a time value $t_s^{new}$ indicating the time at which the update is performed in the source table. The application of the change may result in the previous version of the record which has values $v_1^{old} \ldots v_n^{old}$ of the set of attributes $att_1, \ldots att_n$, and a current version of the record which has values $v_1^{new} \ldots v_n^{new}$ of the set of attributes $att_1, \ldots att_n$. In this case, the start time attribute of the current version of the record in the target table may be set to the received time value $t_s^{new}$ to replace the value $t_s^{old}$, while the value $t_e^{old}$ of the end time attribute is maintained for the current version of the record. That is, the current version of the record may have the following values: $v_1^{new} \ldots v_n^{new}, t_s^{new}, t_e^{old}$ of the attributes $att_1, \ldots att_n, att_{ST}, att_{ET}$ respectively. As to the previous version of the record, the start time attribute may be maintained at the value of $t_s^{old}$, while the end time attribute may be set to the received time value $t_s^{new}$. That is, the previous version of the record may have the following values: $v_1^{old} \ldots v_n^{old}, t_s^{old}, t_s^{new}$ of the attributes $att_1, \ldots att_n, att_{ST}, att_{ET}$ respectively. In other words, the validity time of the previous version record may be the time between the time of creation of the record (or the time of a last update) and the time it is recently updated while the current version of the record may be valid between the time of update and the fixed time value.

In another example, the change is a deletion of an existing record of the source table (and target table). The existing record may, for example, have values $v_1^{old} \ldots v_n^{old}$ of the set of attributes respectively and values $t_s^{old}$ and $t_e^{old}$ of the time attributes $att_{ST}$ and $att_{ET}$ respectively. The request may indicate a time value to $t_e^{new}$ indicating the time at which the deletion of the record is performed in the source table. In this case, there is only the previous version of the record. The end time attribute of the deleted record may be set to the received time value to replace the value $t_e^{old}$, while the value $t_s^{old}$ of the start time attribute is maintained. That is, the previous version of the record may have the following values: $v_1^{old} \ldots v_n^{old}, t_s^{old} t_e^{new}$ of the attributes $att_1 \ldots att_n$, $att_{ST}$, $att_{ET}$ respectively. For example, the deleted record may be valid between the time it was created/last updated and the time it was deleted.

Steps 205 and 207 may, for example, be concurrently performed. The previous version of the record may be stored in the history table in step 209.

Steps 203 to 209 may be repeated one or more times. For example, every data manipulation language (DML) operation on the source table will be replicated to the target table and historized only on the target by repeating steps 203 to 209 e.g., for each DML operation.

A redirected query referencing the source table 190 may be received at the target database system 121 in step 211. The redirected query comprises a selection criterion on the time attribute (or time condition). For example, the query may be received at the source database system 101. Upon detecting the time condition in the query, the source database system 101 may redirect the query to the target database system 121. The target table and the history table may be used to process the redirected query according to the selection criterion in step 213. For example, the time attributes/columns may be used in SQL queries using a variant of the "AS OF<timespan specification>" syntax to "time travel" and run the query on the state of the table as of a specific business or system time period. Every SQL query has the choice of being off-loaded to the target system, or execute on the source as long as it does not contain a time-travel specification. If time travel is requested, the query may be off-loaded to the target database system. If client applications directly connect to the target database system, they can either run on current, replicated data, or use time-travel queries using system time period clauses.

Figure 3:
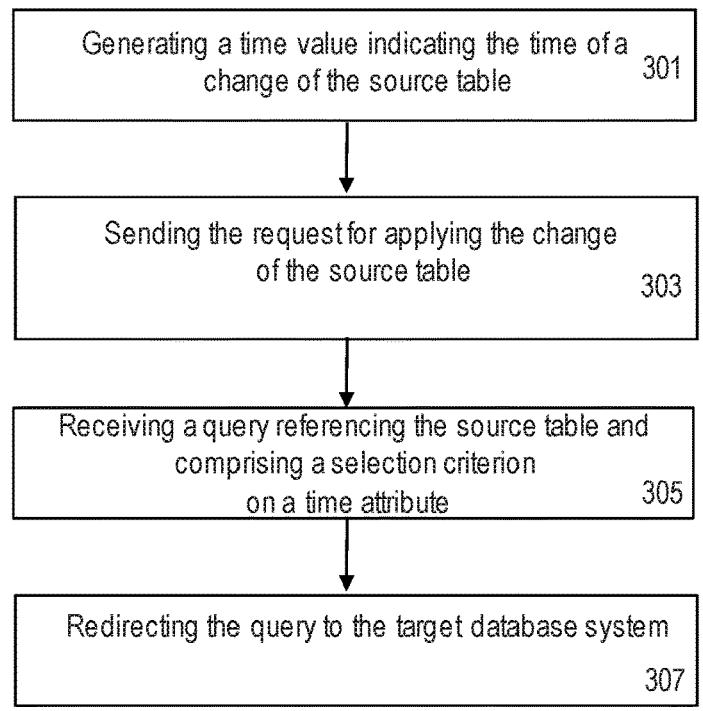
FIG. 3 is a flowchart of a method in a source database system in accordance with an example of the present subject matter.

FIG. 3 is a flowchart of a method in a source database system according to an example of the present subject matter. For the purpose of explanation, the method described in FIG. 3 may be implemented in the system illustrated in FIG. 1A, but is not limited to this implementation. The method of FIG. 3 may, for example, be performed by the source database system.

In response to detecting a change of the source table 190, the source database system 101 may generate a time value indicating the time of the change of the source table 190 in step 301. The time value may, for example, be a timestamp.

The source database system may send a request to the target database system 121 for applying the change of the source table to the corresponding target table at the target database system 121 in step 303. The request may comprise a log record 180 as shown in FIG. 1B comprising the time value as a timestamp. FIG. 1B shows an example content of the log record.

A query refencing the source table 190 may be received at the source database system 101 in step 305.

Upon detecting a selection criterion on a time attribute in the query, the source database system 101 may redirect the query to the target database system 121 so that it can be processed using tables of the target database system 121 in step 307. If the query does not comprise a time condition on the time attribute, the query may be executed at the source database system or offloaded to be executed at the target database system.

Figure 4:
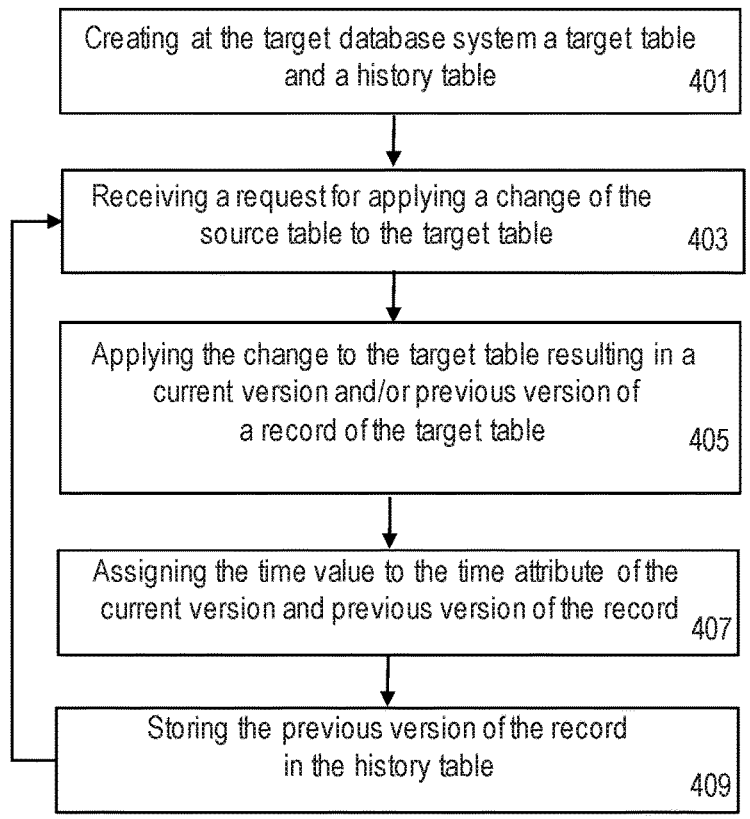
FIG. 4 is a flowchart of a method for maintaining at a target database system a copy of a source table of a source database system in accordance with an example of the present subject matter.

FIG. 4 is a flowchart of a method for maintaining at a target database system a copy of a source table of a source database system, the source table having a set of attributes. For the purpose of explanation, the method described in FIG. 4 may be implemented in the system illustrated in FIG. 1A, but is not limited to this implementation. The method of FIG. 4 may, for example, be performed by the target database system 121 for maintaining a synchronous copy of the source table 190.

A target table and a history table may be created at the target database system 121 in step 401. Each table of the target table and the history table has the set of attributes $att_1, \ldots att_n$ in addition to at least one time attribute. The time attribute of a record indicates the time when the record is valid. A request may be received for applying a change of the source table 190 to the target table in step 403. The change involves at least one record of the source table 190. In addition, the request comprises a time value generated by the source database system indicating a time at which the change is occurred. The change may be applied to the target table in step 405. The application of the change may result in a current version and/or previous version of a record of the target table dependent on the type of the change being applied. The time value may be assigned to the time attribute of the current version and previous version of the record in step 407. For example, the values of the attributes $att_{ST}$ and $att_{ET}$ may be set to the time values received in the request. The previous version of the record may be stored in step 409 in the history table. Steps 403 to 409 may be repeated one or more times. Example implementation details described in FIG. 2 for steps 201 to 209 also apply for the steps 401 to 409 respectively.

Figure 5:
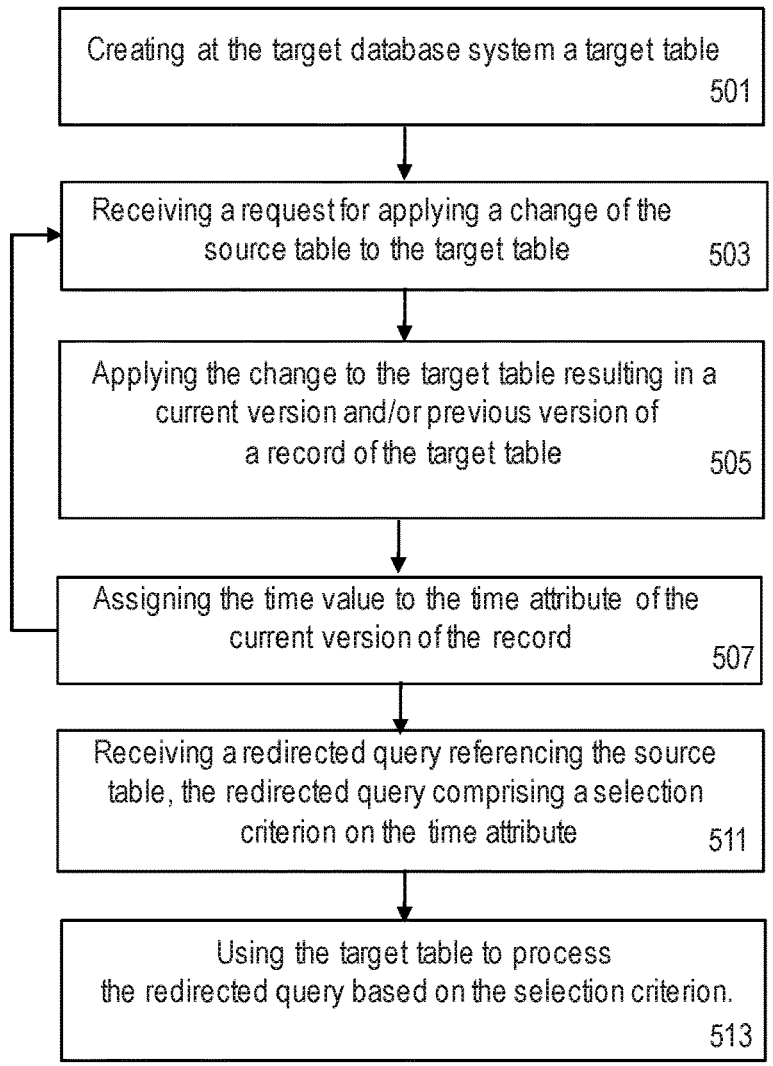
FIG. 5 is a flowchart of a method for maintaining at a target database system a copy of a source table of a source database system in accordance with an example of the present subject matter.

FIG. 5 is a flowchart of a method for maintaining at a target database system a copy of a source table of a source database system, the source table having a set of attributes. For the purpose of explanation, the method described in FIG. 5 may be implemented in the system illustrated in FIG. 1A, but is not limited to this implementation. The method of FIG. 5 may, for example, be performed by the target database system 121 for maintaining a synchronous copy of the source table 190.

A target table and a history table may be created at the target database system 121 in step 501. Each table of the target table and the history table has the set of attributes $att_1, \ldots, att_n$ in addition to at least one time attribute. The time attribute of a record indicates the time when the record is valid. A request may be received for applying a change of the source table 190 to the target table in step 503. The change involves at least one record of the source table 190. In addition, the request comprises a time value generated by the source database system indicating a time at which the change is occurred. The change may be applied to the target table in step 505. The application of the change may result in a current version and/or previous version of a record of the target table dependent on the type of the change being applied. The time value may be assigned to the time attribute of the current version of the record in step 507. For example, the values of the attributes $att_{ST}$ and $att_{ET}$ may be set to the time values received in the request. Steps 503 to 507 may be repeated one or more times.

A redirected query referencing the source table 190 may be received at the target database system 121 in step 511. The redirected query comprises a selection criterion on the time attribute. For example, the query may be received at the source database system 101. Upon detecting the time condition in the query, the source database system 101 may redirect the query to the target database system 121. The target table may be used to process the redirected query according to the selection criterion in step 513. Example implementation details described in FIG. 2 for steps 201 to 207 and 211-213 also apply for the steps 501 to 507 and 511-513 respectively. It may, for example, happen that the target table becomes empty at certain point of times. In this case, the query may be processed against the empty table, and the selection criterion would not be fulfilled.

Figure 6:
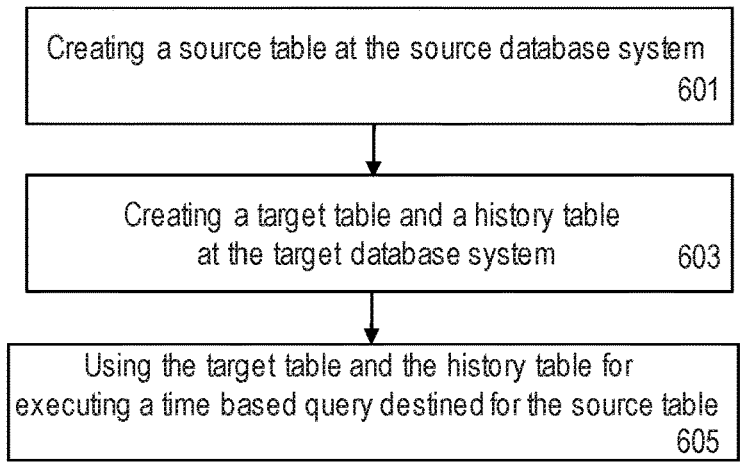
FIG. 6 is a flowchart of a method for maintaining at a target database system a copy of a source table of a source database system in accordance with an example of the present subject matter.

FIG. 6 is a flowchart of a method for maintaining at a target database system a synchronous copy of a source table of a source database system.

A source table may be created in the source database system in step 601. This may, for example, be performed using the following SQL statement:

CREATE TABLE POLICY (
BANK VARCHAR(4), CLIENT CHAR(4), TYPE CHAR (5), PAY INT,
PRIMARY KEY (BANK, CLIENT)
);

The source table comprises the set of attributes named BANK, CLIENT and PAY which may represent a bank name, a client name and the pay associated with the client. These attributes may be non-temporal attributes.

A target table and history table may be created in the target database system in step 603. Each of the target table and history table has the set of attributes of the source table and additional time attributes. The target table may be created using the following SQL statement:

CREATE TABLE POLICY_TGT (
BANK VARCHAR(4), CLIENT CHAR(4), TYPE CHAR (5), PAY INT,
SYS_BEGIN TIMESTAMP(12) NOT NULL AS ROW BEGIN, SYS_END
TIMESTAMP(12) NOT NULL AS ROW END, TRANS_ID TIMESTAMP(12)
NOT NULL, PERIOD SYSTEM_TIME (SYS_BEGIN, SYS_END),
PRIMARY KEY (BANK, CLIENT)
);

The target table has the time attributes: SYS_BEGIN, SYS_END and PERIOD. The SYS-BEGIN attribute contains the timestamp value for when a row is created. The SYS-END column contains the timestamp value for when a row is removed. The PERIOD attribute is a system-maintained period in which the beginning and ending timestamp values for a row are maintained. The target table further comprises a TRANS_ID attribute. The TRANS_ID attribute contains a unique timestamp value that is assigned per transaction.

The history table may be created using the following SQL statement:
CREATE TABLE POLICY_TGT_HIST (
BANK VARCHAR(4), CLIENT CHAR(4), TYPE CHAR (5), PAY INT,
SYS_BEGIN TIMESTAMP(12) NOT NULL, SYS_END TIMESTAMP(12) NOT NULL,
TRANS_ID TIMESTAMP(12),
PRIMARY KEY (BANK, CLIENT));
ALTER TABLE POLICY_TGT ADD VERSIONING USE HISTORY TABLE POLICY_TGT_HIST;

The history table has the time attributes: SYS_BEGIN, SYS_END. The history table further comprises the TRANS_ID attribute.

The attributes SYS_BEGIN, SYS_END and TRANS_ID are not defined as system-generated (GENERATED ALWAYS), but rather use-generated columns. The purpose may be to allow time-travel on the target system in the time definition of the source databases system. These columns may not be generated by the target database system "as of the time" the change was replicated to the target, because replication typically is an asynchronous process. The timestamps would be off by the amount of current replication latency as of the time of the target apply operation. Latency varies over time, thus may be making time-travel as of the source time impossible. For that, the replication process may extract the required source data modification timestamp from the transaction recovery log. Recovery log records of the source system are the basis for change data capture replication and accurately describe the change to the source table, including timestamps in source system clock time when the change happened and under which transaction the change occurred. When loading data for the first time, all SYS_BEGIN columns get initialized with the time of the sources system at the time of the load and SYS_END is initialized to NULL. Alternatively, users can be asked what SYS_BEGIN should be used for a given table at the time the target table load operation is initiated. FIG. 1B shows the structure of sequence of log records on Db2 for z/OS. The part to be used may be the timestamp value (in source clock time) that is to be added to each log record produced by the source database system, and use a value that represents the time as of when the change happened. This timestamp is the additional information captured by replication and used to populate the SYS_BEGIN and SYS_END columns, depending of the nature of the change, i.e., SYS_BEGIN=timestamp when it is an insert, SYS_END when a delete. Updates are decomposed into a pair of <delete, insert> events.

A query on the target system now can use the time-travel clause and specify the system time period as of the time of the source system, for example: SELECT CLIENT, PAY FROM POLICY_TGT FOR SYSTEM_TIME FROM '2010-06-01-00.00.00.000000000000' TO '2011-06-01-00.00.00.000000000000' WHERE BANK='CCB1' AND CLIENT='BUPT';

The query may be processed on the target and history table in step 605.

The present subject matter comprises the following clauses.

Clause 1. A computer implemented method for maintaining at a target database system a copy of a source table of a source database system, the source table having a set of attributes; the method comprising: creating at the target database system a target table and a history table each having the set of attributes in addition to at least one time attribute, wherein the time attribute of a record indicates the time when the record is valid; and repeatedly: receiving a request for applying a change of the source table to the target table, the change involving at least one record of the source table, the request comprising a time value generated by the source database system indicating a time of the change, applying the change to the target table resulting in a current version and/or previous version of a record of the target table and assigning the time value to the time attribute of the current version and previous version of the record, and storing the previous version of the record in the history table; receiving a redirected query referencing the source table, the redirected query comprising a selection criterion on the time attribute; using the target table and the history table to process the redirected query according to the selection criterion.

Clause 2. The method of clause 1, the query being a time travel query.

Clause 3. The method of clause 1 or 2, the change being a deletion of at least one record, update of at least one record and/or insertion of at least one record, wherein in case the change is a deletion of the record, the application of the change results in the previous version of the record which is the deleted record, wherein in case the change is an update of the record, the application of the change results in the current version and the previous version of the record, wherein in case the change is an insertion of the record, the application of the change results in the current version of the record which is the inserted record.

Clause 4. The method of any of the preceding clauses 1 to 3, the at least one time attribute comprising a start time attribute and end time attribute, wherein the start time attribute of the current version of the record indicates the time of insertion of the record in the source table or the time of update of the record in the source table, wherein the end time attribute of the current version of the record is set to a fixed maximum value, wherein the start time attribute of the of the previous version of the record indicates the time of insertion of the previous version record in the source table or the time of the update of the previous version of the record in the source table, wherein the end time of the previous version of the record indicates the time of deletion of the previous version record from the source table or the time of an update of the previous version of the record.

Clause 5. The method of any of the preceding clauses 1 to 4, wherein the set of attributes are non-temporal attributes.

Clause 6. The method of any of the preceding clauses 1 to 5, the time value being a timestamp of the source database system.

Clause 7. The method of any of the preceding clauses 1 to 6, wherein the received request comprises a log record, the log record comprising the involved record and the time value as a timestamp.

The present invention may be a system, a method, and/or a computer program product at any possible technical detail level of integration. The computer program product may include a computer readable storage medium (or media) having computer readable program instructions thereon for causing a processor to carry out aspects of the present invention. A 'processor' as used herein encompasses an electronic component which is able to execute a program or machine executable instruction or computer executable code. The processor may for instance be a multi-core processor. A processor may also refer to a collection of processors within a single computer system or distributed amongst multiple computer systems. The computer executable code may be executed by multiple processors that may be within the same computing device or which may even be distributed across multiple computing devices.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method for maintaining, at a target database system, a copy of a source table of a source database system, the source table having a set of attributes; the method comprising:
creating, at the target database system, a target table and a history table, each having the set of attributes including at least one time attribute, wherein the time attribute of a record indicates the time when the record is valid; and repeatedly:
receiving a request for applying a change of the source table to the target table, the change involving at least one record of the source table, the request comprising a time value generated by the source database system indicating a time of the change;
applying the change to the target table resulting in a current version and/or previous version of a record of the target table and assigning the time value to the time attribute of the current version and previous version of the record, wherein a start time attribute of the current version of the record indicates the time of insertion of the record in the source table or the time of update of the record in the source table, wherein the end time of the previous version of the record indicates the time of deletion of the previous version record from the source table or the time of an update of the previous version of the record;
storing the previous version of the record in the history table;
receiving a redirected query referencing the source table, the redirected query comprising a selection criterion on the time attribute; and
using the target table and the history table to process the redirected query according to the selection criterion.

2. The method of claim 1, the query being a time travel query.

3. The method of claim 1, the change selected from the group consisting of a deletion of at least one record, an update of at least one record and insertion of at least one record.

4. The method of claim 3, wherein the deletion of the record results in the previous version of the record being the deleted record.

5. The method of claim 3, wherein the update of the record results in the current version and the previous version of the record.

6. The method of claim 3, wherein the insertion of the record results in the current version of the record being the inserted record.

7. The method of claim 1, the at least one time attribute comprising a start time attribute and end time attribute, wherein the start time attribute of the current version of the record indicates the time of insertion of the record in the source table or the time of update of the record in the source table, wherein the end time attribute of the current version of the record is set to a fixed maximum value, wherein the start time attribute of the of the previous version of the record indicates the time of insertion of the previous version record in the source table or the time of the update of the previous version of the record in the source table, wherein the end time of the previous version of the record indicates the time of deletion of the previous version record from the source table or the time of an update of the previous version of the record.

8. The method of claim 1, wherein the set of attributes are non-temporal attributes.

9. The method of claim 1, the time value being a timestamp of the source database system.

10. The method of claim 1, wherein the received request comprises a log record, the log record comprising the involved record and the time value as a timestamp.

11. A computer program product for maintaining a copy of a source table of a source database system at a target database system, the computer program product comprising one or more computer readable storage media and program instructions collectively stored on the one or more computer readable storage media, the stored program instructions comprising:
program instructions to create, at the target database system, a target table and a history table, each having the set of attributes including at least one time attribute, wherein the time attribute of a record indicates the time when the record is valid; and repeatedly:
program instructions to receive a request for applying a change of the source table to the target table, the change involving at least one record of the source table, the request comprising a time value generated by the source database system indicating a time of the change;
program instructions to apply the change to the target table resulting in a current version and/or previous version of a record of the target table and assigning the time value to the time attribute of the current version and previous version of the record, wherein a start time attribute of the current version of the record indicates the time of insertion of the record in the source table or the time of update of the record in the source table, wherein the end time of the previous version of the record indicates the time of deletion of the previous version record from the source table or the time of an update of the previous version of the record;
program instructions to store the previous version of the record in the history table;
program instructions to receive a redirected query referencing the source table, the redirected query comprising a selection criterion on the time attribute; and
program instructions to use the target table and the history table to process the redirected query according to the selection criterion.

12. The computer program product according to claim 11, the query being a time travel query.

13. The computer program product according to claim 11, the change selected from the group consisting of a deletion of at least one record, an update of at least one record and insertion of at least one record.

14. The computer program product according to claim 11, the at least one time attribute comprising a start time attribute and end time attribute, wherein the start time attribute of the current version of the record indicates the time of insertion of the record in the source table or the time of update of the record in the source table, wherein the end time attribute of the current version of the record is set to a fixed maximum value, wherein the start time attribute of the of the previous version of the record indicates the time of insertion of the previous version record in the source table or the time of the update of the previous version of the record in the source table, wherein the end time of the previous version of the record indicates the time of deletion of the previous version record from the source table or the time of an update of the previous version of the record.

15. The computer program product according to claim 11, wherein the set of attributes are non-temporal attributes.

16. The computer program product according to claim 11, the time value being a timestamp of the source database system.

17. The computer program product according to claim 11, wherein the received request comprises a log record, the log record comprising the involved record and the time value as a timestamp.

18. A target database system for maintaining a copy of a source table of a source database system, the source table having a set of attributes; the target database system comprising one or more computer processors; one or more computer readable storage devices; and stored program instructions on the one or more computer readable storage devices for execution by the one or more computer processors, the stored program instructions comprising:
program instructions to create, at the target database system, a target table and a history table, each having the set of attributes including at least one time attribute, wherein the time attribute of a record indicates the time when the record is valid; and repeatedly:
program instructions to receive a request for applying a change of the source table to the target table, the change involving at least one record of the source table, the request comprising a time value generated by the source database system indicating a time of the change;
program instructions to apply the change to the target table resulting in a current version and/or previous version of a record of the target table and assigning the time value to the time attribute of the current version and previous version of the record, wherein a start time attribute of the current version of the record indicates the time of insertion of the record in the source table or the time of update of the record in the source table, wherein the end time of the previous version of the record indicates the time of deletion of the previous version record from the source table or the time of an update of the previous version of the record;
program instructions to store the previous version of the record in the history table;
program instructions to receive a redirected query referencing the source table, the redirected query comprising a selection criterion on the time attribute; and
program instructions to use the target table and the history table to process the redirected query according to the selection criterion.

19. The data analysis system of claim 18, the source database system being configured for:
   generating a time value indicating the time of a change of the source table;
   sending the request for applying the change of the source table;
   receiving the query;
   upon detecting the time condition in the query, redirecting the query to the target database system.

20. The data analysis system of claim 18, the source database system being an online transaction processing (OLTP) system, the target database system being an online analytical processing (OLAP) system.

21. The data analysis system of claim 18, the source database system being an online transaction processing (OLTP) system, the target database system being a graph store.

22. A computer implemented method for maintaining, at a target database system, a copy of a source table of a source database system, the source table having a set of attributes; the method comprising:
   creating, by one or more computer processors, a source table at the source database system;
   creating, by the one or more computer processors, a target table and a history table at the target database system; and
   using, by the one or more computer processors, the target table and history table for executing time based query destined for the source table.

23. A computer implemented method for maintaining, at a target database system, a copy of a source table of a source database system, the source table having a set of attributes; the method comprising:
   creating, at the target database system, a target table and a history table, each having the set of attributes including at least one time attribute, wherein the time attribute of a record indicates the time when the record is valid; and repeatedly:
   receiving a request for applying a change of the source table to the target table, the change involving at least one record of the source table, the request comprising a time value generated by the source database system indicating a time of the change;
   applying the change to the target table resulting in a current version and/or previous version of a record of the target table and assigning the time value to the time attribute of the current version and previous version of the record, wherein a start time attribute of the current version of the record indicates the time of insertion of the record in the source table or the time of update of the record in the source table, wherein the end time of the previous version of the record indicates the time of deletion of the previous version record from the source table or the time of an update of the previous version of the record;
   receiving a redirected query referencing the source table, the redirected query comprising a selection criterion on the time attribute; and
   using the target table and the history table to process the redirected query according to the selection criterion.

24. The method of claim 23, the query being a time travel query.

25. The method of claim 23, the change selected from the group consisting of a deletion of at least one record, an update of at least one record and insertion of at least one record.

* * * * *